United States Patent [19]

Imai et al.

[11] Patent Number: 4,864,112

[45] Date of Patent: Sep. 5, 1989

[54] BAR CODE LABEL

[75] Inventors: Yasuhito Imai, Oobu; Atsutoshi Okamoto, Aichi; Toshiyasu Sakai, Kariya, all of Japan

[73] Assignee: Nippondenso Co., Ltd., Kariya, Japan

[21] Appl. No.: 126,055

[22] Filed: Nov. 27, 1987

[30] Foreign Application Priority Data

Nov. 26, 1986 [JP] Japan .................................. 61-282442

[51] Int. Cl.[4] .............................................. G06K 7/10
[52] U.S. Cl. ..................................... 235/463; 235/436; 235/494; 235/462
[58] Field of Search ................ 235/436, 462, 463, 487, 235/494

[56] References Cited

U.S. PATENT DOCUMENTS 4,059,224 11/1977 Seligman .............................. 235/462
4,130,243 12/1978 Stevens .......................... 235/463 X
4,488,678 12/1984 Hara et al. .......................... 235/463

FOREIGN PATENT DOCUMENTS 55-43491 10/1980 Japan .

Primary Examiner—David L. Trafton
Attorney, Agent, or Firm—Cushman, Darby & Cushman

[57] ABSTRACT

A bar code label comprises a recording medium and a bar code recorded on a recording medium. The bar code includes a plurality of bar elements lined up parallel. Each width of bar elements is different in accordance with the kind of bar elements. The width of the bar elements is made wider than it would normally be based on its distance from the center of the bar code toward the end of the bar code.

17 Claims, 10 Drawing Sheets

BAR CODE LABEL

BACKGROUND OF THE INVENTION

This invention relates in general to bar coding. More specifically, it provides a bar code label made of a recording medium having a bar code printed thereon and a method for printing a bar code.

A bar code generally includes a plurality of bars having a different optical reflectance than that of a background on which they are printed. The bars are arranged side by side with spaces therebetween to display information. The information may be encoded into the width of the bars, the spacing of the bars or both the width and spacing of the bars.

For example, the bars may be black on a white background (represented by spaces between the black bars). Various bar code schemes are known which are differentiated from one another based on the manner in which information is encoded, such as specific widths, sequences, etc. The various encoding schemes have names such as, for example, "NW-7", "2 of 5", "code 39", etc.

In this connection, a bar code reader is also known which optically reads the width of each bar of a bar code on the basis of a difference in reflectance of the bars with respect to the background. For example, one type of reader reads a bar code by focusing an image of the bar code on an image sensor and converting the image into an electric signal.

In the prior art, it is known to uniformly print the bars of a bar code with a predetermined ratio of bar width to some reference value of width based on the encoding scheme being used. This predetermined ratio is used without regard to the shape of the surface on which the bar code is being applied. Sometimes, a bar code is printed on a curved surface such that the widthwise direction of the bars of the bar code coincide with the circumferential direction of the curved surface. Other times, the bar code may be printed on a seal which is later applied to a curved surface in the same manner. However, the surface curvature can cause a reading error. When a bar code provided on such a curved surface is read by the bar code reader, the width of a bar provided in a portion of the curved surface having a large gradient is detected as if it were narrower than the width of another bar provided in another portion of smaller gradient. Therefore, erroneous readings occur which cause reading efficiency to be low and the dependability of information to also be low.

Further, in the case of providing a bar code on a cylindrical surface, it is general in the prior art to make the widthwise direction of bars parallel to the axial direction of the cylinder. Although this helps to overcome the problem discussed above to some degree, using the axial orientation is very limiting. For price labels, merchandise or boxes must be designed in such a manner to accommodate the axial orientation of the bar code label.

As an example of the problems caused by curved surfaces, consider a bar code label applied to a "belt" around a portion of the human body as shown in FIG. 11. If it is desired to make the axial direction of the belt coincide with the widthwise direction of bars, the belt must be a comparatively large size in its transverse direction.

FIG. 11 illustrates a belt 4 tied around a person's wrist. The belt 4 comprises a holder portion 41 and belt portions 43 and 44 extending in both directions from the holder portion, with the holder portion 41 including a transparent window portion 42. A bar code label 1 is inserted in the holder portion 41, and the belt portions 43 and 44 are coupled together by appropriate clamp means. The belt portions 43 and 44 are provided with a plurality of hooks, magic tapes, etc. so as to be adaptable to a variety of thickness.

Such label holders as above are used in medical institutions to discriminate individual patients, hence, a light feeling of attachment is requested. However, if it is necessary to make the widthwise direction of the bars of a bar code 2 coincide with the axial direction of the belt tied as above, the width E of the holder portion 41 must be larger than desireable. This tends to hinder the patient's movement.

SUMMARY OF THE INVENTION

It is an object of the present invention to provide a bar code which can be accurately read even when the widthwise direction of the bars of a printed bar code are applied to a curved surface.

It is another object of the present invention to provide a bar code label which can be accurately read when a label having the bar code thereon is affixed to a curved surface such that the widthwise direction of its bars are curved.

The invention accomplishes these and other objects by providing a new bar code arrangement and a method of printing a bar code. According to the present invention, the width of a bar code element is not only determined by the information coded therein, as in the prior art, but is also "adjusted" based on the distance of the bar code element from the center of the bar code. The bar elements are made wider as they are spaced further from the center to compensate for the curve of a surface on which they are applied. Even on a steep gradient curve, an image of the bar code produced by an optical reader will have a sufficient width of each element to enable it to be read.

According to one embodiment of the invention, the width of the bar code elements is widened group by group of elements such that each element in a given group of elements is printed in accordance with the same width ratio with respect to a reference width. The reference width of each group can be differentiated from the reference width of another group.

According to another embodiment of the invention, the ratio relationship of the width of bar element to the reference width is differentiated group by group.

More specifically, one embodiment of the present invention provides a bar code label displaying encoded information, including:

(a) a recording medium; and (b) a bar code recorded on the recording medium, the bar code having a plurality of parallel bar elements, each of which has a width indicating a code of the encoded information, the bar code being divided into at least three groups, each group having a plurality of the bar elements, a third group provided between first and second groups, a width of a first bar element of the second group indicating the same code as that of a second bar element of the third group, the first bar element of the second group being wider than that of the second bar element of the third group.

Another embodiment of the invention provides a bar code label displaying encoded information comprising:

(a) a recording medium; and (b) a bar code recorded on the recording medium, the bar code having a plurality of parallel bar elements, each of which has a width having some ratio relationship of bar element width to reference width, the width of each bar element indicating a code of the encoded information, the bar code being divided into at least three groups, each having a plurality of the bar elements and an associated reference width, a third group being provided between a first and a second group, a reference width of the second group being wider than a reference width of the third group.

Another embodiment of the invention provides a bar code label displaying encoded information, comprising:

(a) a recording medium; and, (b) a bar code recorded on the recording medium, the bar code having a plurality of parallel bar elements, each of which has a width having some ratio relationship of bar element width to a reference width, the width of each bar element indicating a code of the encoded information, the bar code being divided into at least three groups, each having a plurality of the bar elements and a ratio associated with these widths, a third group being provided between a first and a second group, the ratio of the second group being greater than the ratio of the third group.

The invention also provides a method for printing bar code on a recording medium, comprising steps of:

(a) inputting an information to be encoded into a bar code;

(b) encoding the information as a bar code train including at least three parts:

(c) first printing a plurality of a first bar elements, each of which has a width indicating a code of a third part of the code train, the third part being provided between a first and a second part of the code train; and (d) second printing a plurality of a second bar elements, each of which has a width indicating a code of the second parts of the code train and being wider than a width of the first bar element indicating a same code of the second bar element, so that the bar code being divided into at least three groups, a third group being provided between a first and a second group, a width of the second bar element of the second group indicating the same code as that of the first bar element of the third group, the second bar element of the second group being wider than that of the first bar element of the third group.

The invention also provides a method for printing a bar code on a recording medium, comprising steps of:

(a) inputting information to be encoded as a bar code;

(b) encoding the information into a bar code train having at least three parts, a third part provided between a first and second parts;

(c) first printing a plurality of parallel first bar elements, each of which has a width having some ratio relationship of bar element width to a reference width, the width of each of the first bar element indicating a code of the third part of the code train; and (d) second printing a plurality of parallel second bar elements, each of which has a width having some ratio relationship of bar element width to a reference width being wider than the reference width of the first bar elements, the width of each of the second bar elements indicating a code of the second part of the code train, so that the width of the second bar element indicating the same code as that of the first bar element being wider than that of the first bar element.

BRIEF DESCRIPTION OF THE DRAWINGS

FIGS. 9 and 10 are flowcharts showing the operation of the bar code reader; an

DETAILED DESCRIPTION OF THE PREFERRED EMBODIMENTS

Bar code labels hereinafter described representative of the embodiments are of the form of a seal having a bar code printed thereon, which is adapted to be affixed to a cylindrical subject. Of course, the bar code label according to the present invention is not limited to such a type of seal, but is also applicable to bar codes directly printed on tags or packages, bar codes directly printed on subjects, and the like. The configurations of the embodiments of the bar code label embodying the present invention will first be described.

Figure 1:
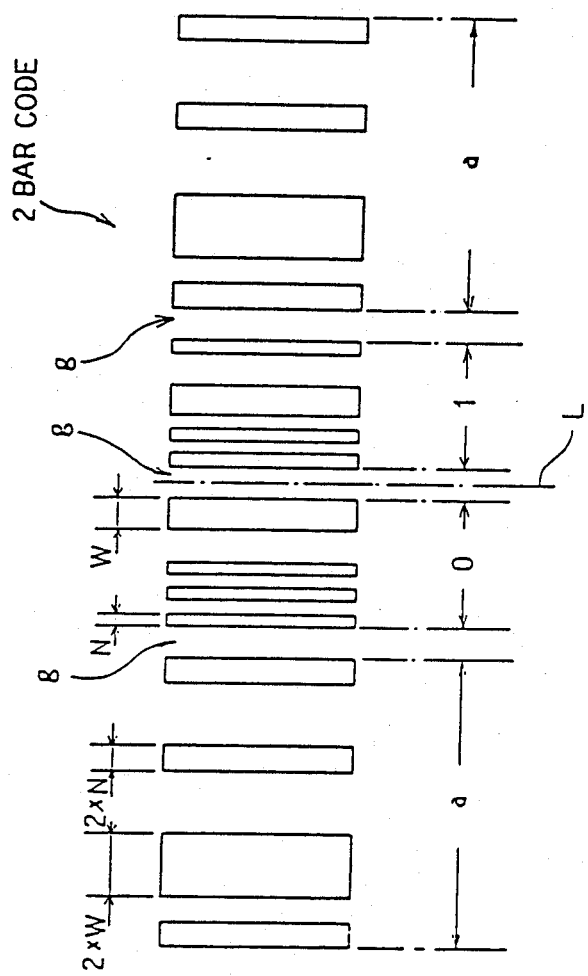
FIG. 1 is a plan view of a bar code to be printed on a bar code label of a first embodiment of the present invention.
Figure 2A:
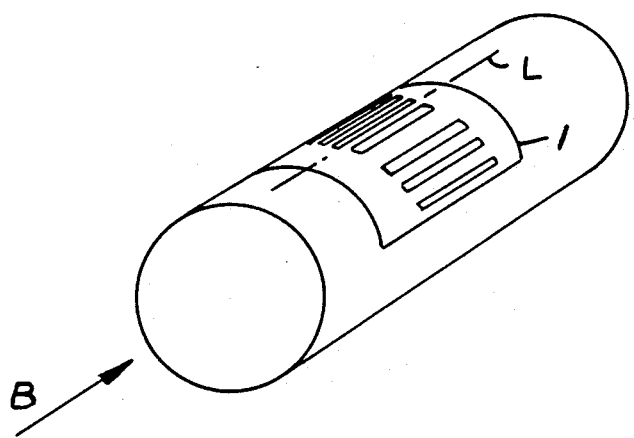
FIG. 2(a) is a perspective view of the bar code label provided on a circumferential surface.
Figure 2B:
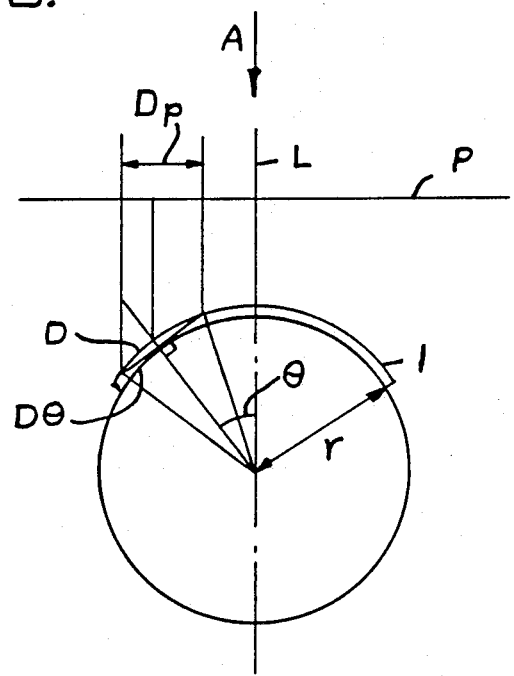
FIG. 2(b) is a sectional view of the bar code label as viewed in the direction of the arrow B in FIG. 2(a)

FIG. 1 is a plan view of a bar code to be printed on a bar code label of a first embodiment. FIG. 1 shows black boxes printed on a white background. Each black box serves as a black bar, whereas each space between the boxes serves as a white bar. Where a bar code 2 is printed as shown in FIGS. 2A and 2B, when reading this bar code 2 from the direction of the arrow A in FIG. 2(b), reading of bars becomes impossible as an angle $\theta$ formed about the center of a circle by a center line L and either end of the bar code approaches 90°. Considering arcs D of the same length along a circumferential surface within a range of $0° \leq \theta \leq 90°$, the larger the $\theta$, the narrower the width of an arc to be seen in reading. Taking a chord $D_\theta$ as the length of the arc D, a width $D_p$ formed when the chord is projected on a plane P is given by $$D_p = D_\theta \times \cos \theta.$$

In this embodiment, the bars of two character codes (a start code and a stop code) which are arranged at either end of the bar code represented using one bar code system called "NW-7" are doubled in width in comparison with the other character codes. Of course, the N:W (narrow:wide) ratio of the bars of the endmost character codes is of the order of 1:2.5 which is established in the NW-7 system.

The provision of doubling in terms of width only the bars of the endmost character codes is adopted from the view point of the printing precision of a bar code printer system hereinafter described. The printer system may include a dot printer, laser printer, special purpose printer, etc. In the above, the $\theta$ is supposed to increase as large as 60°.

In case the $\theta$ is supposed to increase as large as 45°, the relation, $D_\theta = D_p / \cos \theta$, applies. Thus, the bars of the endmost character codes may be increased in width by a factor of 1.4 in consideration of the relation, $$D_\theta = D_p \times 1.4$$

A bar code printer system used to print the bar code of the first embodiment will now be described.

Figure 3:
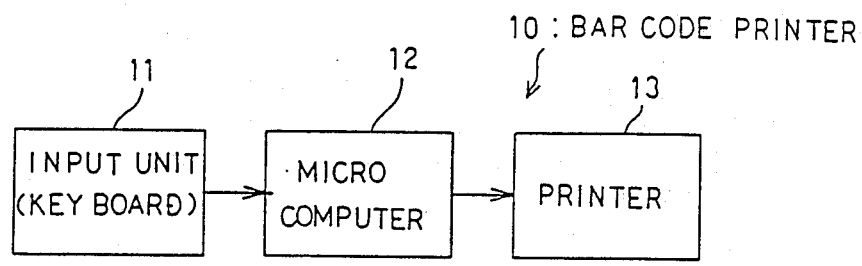
FIG. 3 is a block diagram of a bar code printer system.

FIG. 3 is a block diagram showing the configuration of a bar code printer system 10. An input unit 11 is provided with a keyboard. A control unit 12 is provided with a microcomputer. A printer 13 is a high-density dot printer.

Figure 4:
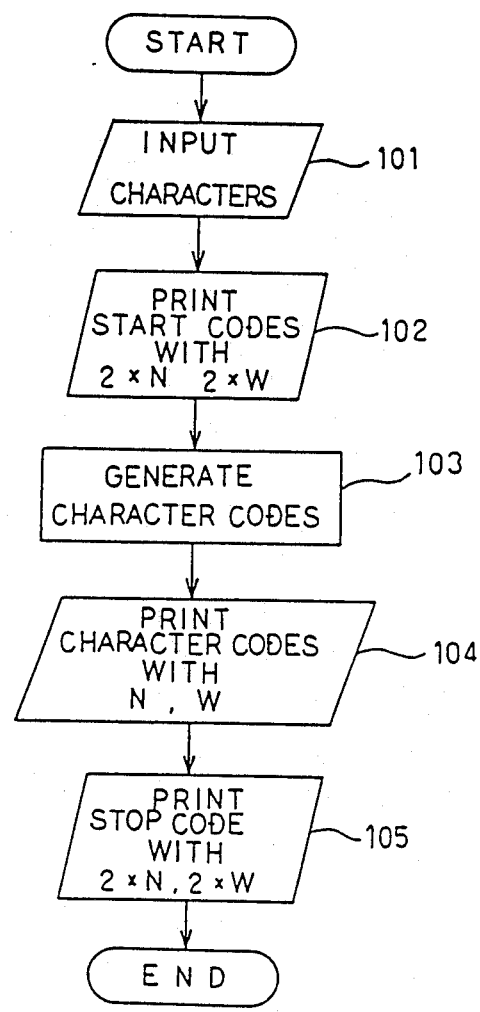
FIG. 4 is a flowchart showing the operation of the bar code printer system to print the bar code of the first embodiment.

The operation of the bar code printer system 10 will now be described with reference to FIGS. 3 and 4. FIG. 4 is a flowchart showing the operation of the control unit 12. In step 101, a character train desired to be converted into a bar code is input through the input unit 11. In the case of the bar code shown in FIG. 1, "0" and "1" are the characters.

In step 102, the bars of a character code serving as the start code are printed, under the predetermined condition that a reference width for a narrow bar is N and a reference width W for a wide bar is $2.5 \times N$ ($=W$), in such a way that each of narrow bars and narrow spaces has a width of $2 \times N$ and each of wide bars and wide spaces has a width of $2 \times W$. In the case of FIG. 1, "a" arranged at the left-hand end corresponds to the character of the start code.

In step 103, character codes corresponding to the characters inputted in step 101 are generated in accordance with the "NW-7" encoding system previously selected. In the case of FIG. 1, there are generated "0000011" and "0000110".

In step 104, the bars of the character codes generated in step 103 are printed with a width of N for narrow bars and narrow spaces and a width of W for wide bars and wide spaces. Of course, each character gap between the respective character codes determined in the NW-7 system is provided so as to have a width of W. In the case of FIG. 1, "g" corresponds to the character gap.

In step 105, the bars of a character code serving as the stop code are printed in such a way that each of narrow bars and narrow spaces has a width of $2 \times N$ and each of the wide bars and wide spaces has a width of $2 \times W$. In the case of FIG. 1, "a" arranged at the right-hand end corresponds to the character of the stop code.

By providing the bar code label 1 of the first embodiment on a circumferential surface and reading it using a bar code reader hereinafter described, the width of each bar of character codes arranged in a central portion can be read comparatively accurately. But, the width of each bar of the endmost character codes is read as if it were narrower than as it is due to the gradient of the circumferential surface. However, since the width of each bar of the endmost character codes is previously widened, the width can be read with an adequate dimension even when the circumferential surface exhibits some gradient.

Therefore, the bar code label 1 of the first embodiment can reduce a possibility of erroneous reading even when it is provided on the circumferential surface.

Further, since the width of each bar is widened per character code, it can be read even when the bar code label 1 is provided on a flat surface.

Figure 5:
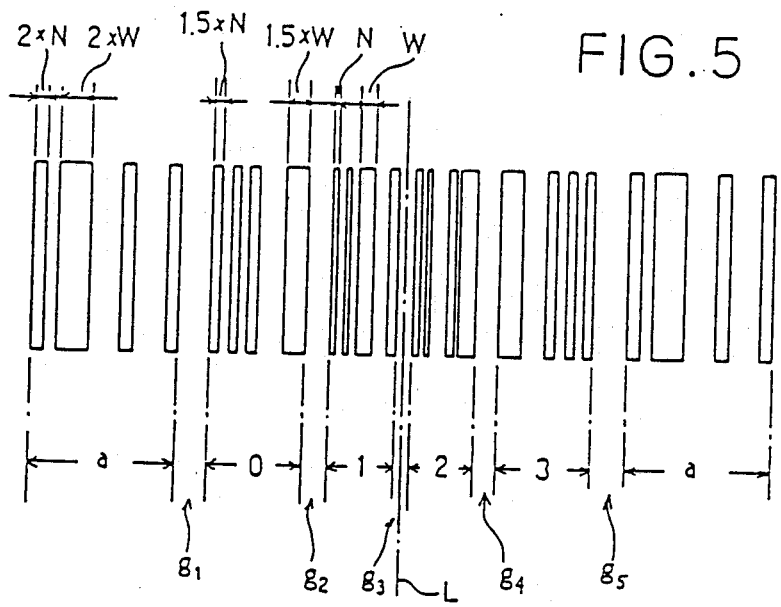
FIG. 5 is a plan view of a bar code to be printed on the bar code label of a second embodiment of the present invention.

FIG. 5 is a plan view of a bar code to be printed on the bar code label of a second embodiment. In this embodiment, the bars of the endmost character codes are printed with a width of two times the reference value N, W, but, the bars of the character codes displaced one place inward from either end are printed with a width of 1.5 times the reference value N, W. The bars of the other character codes are printed with the reference value N, W.

Further, each of the character gaps $g_1$ and $g_5$ arranged at the outermost positions has a width of $2 \times W$, each of character gaps $g_2$ and $g_4$ displaced one position inward has a width of $1.5 \times W$, and each of the other character gaps $g_3$ has a width of W.

A bar code printer system for printing the second embodiment is identical in configuration with that shown in FIG. 3. But, the printer 13 must be able to print bars of 1: 1.5 : 2 in width, hence, a laser printer or special purpose printer is desirable.

Figure 6:
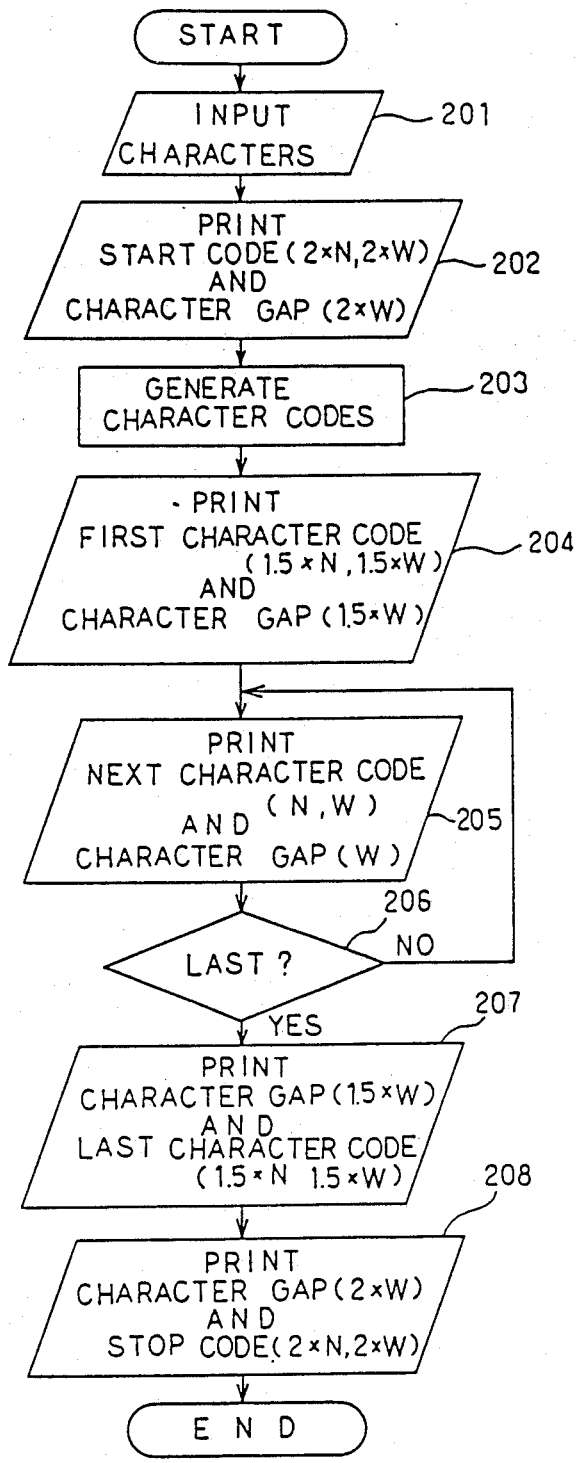
FIG. 6 is a flowchart showing the operation of the bar code printer system to print the bar code of the second embodiment.

FIG. 6 is a flowchart showing the operation of the control unit 12 for performing printing of the bar code of the second embodiment.

In step 201, a character train desired to be converted into a bar code is inputted through the input unit 11. In the case of FIG. 5, the train is "0", "1", "2" and "3". In step 202 and in step 208, the start code and the stop code are printed using narrow bars and narrow spaces of a width of $2 \times N$ and wide bars and wide spaces of a width of $2 \times W$.

In step 203, character codes corresponding to the characters inputted in step 201 are generated in accordance with the "NW-7" encoding system. In step 204 and in step 207, the endmost character code of the character train is printed using a width of $1.5 \times N$ and of $1.5 \times W$, and the character gap of a width of $1.5 \times W$ is provided on the inside of the former. The remaining character codes and character gaps are printed and provided in step 205 and in step 206.

The second embodiment can reduce further a possibility of erroneous reading, in addition to the effects of the first embodiment. That is, in case the bar code label 1 is provided on the circumferential surface, when reading using the bar code reader the width of each bar seems as if it became progressively narrower as its position approaches either end of the circumferential surface. Therefore, if the magnifying factor of each character code is increased progressively, the gradient of the circumferential surface is cancelled, whereby a possibility of erroneous reading can be reduced.

Figure 7:
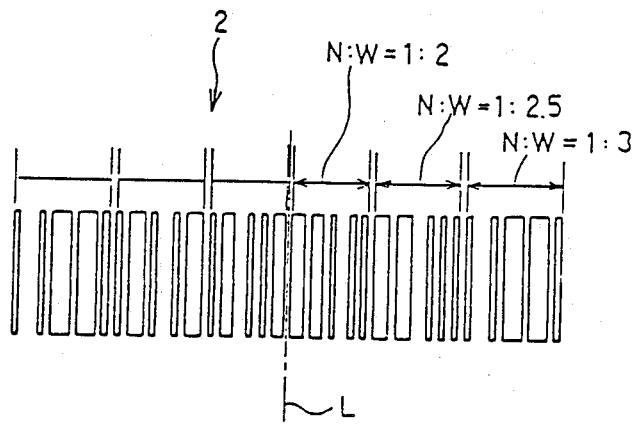
FIG. 7 is a plan view of a bar code to be printed on the bar code label of a third embodiment of the present invention.

FIG. 7 is a plan view of a bar code to be printed on the bar code label of a third embodiment. In this embodiment, the "code 39" bar code system is adopted. Among the character codes forming the bar code 2, each endmost character code is printed using bars and spaces whose N:W ratio is 1:3, each character code displaced one place inward from the former is printed with a N:W ratio of 1:2.5, and the other inside character codes are printed with a N:W ratio of 1:2.

The reason of using the foregoing provision is that although the character codes adjacent to the center line L can be read comparatively accurately even when provided on the circumferential surface, the width of each bar seems to the reader as if it became progressively narrower as its position approaches either end.

That is, for the character codes adjacent to the center line L, the width of each bar can be read comparatively accurately even if the N:W ratio is comparatively small, thus, it is possible to discriminate between narrow and wide. However, since the gradient of the circumferential surface gradually increases as approaching either end, it is necessary to make the N:W ratio comparatively large for the character codes close to either end to perform discrimination between narrow and wide.

Though the N:W ratio is set as of the order of 1:1.5, by making the ratio for both endmost character codes larger than the above and smaller for the central character codes, it is possible to suppress an increase of the whole length of the bar code 2.

Figure 8:
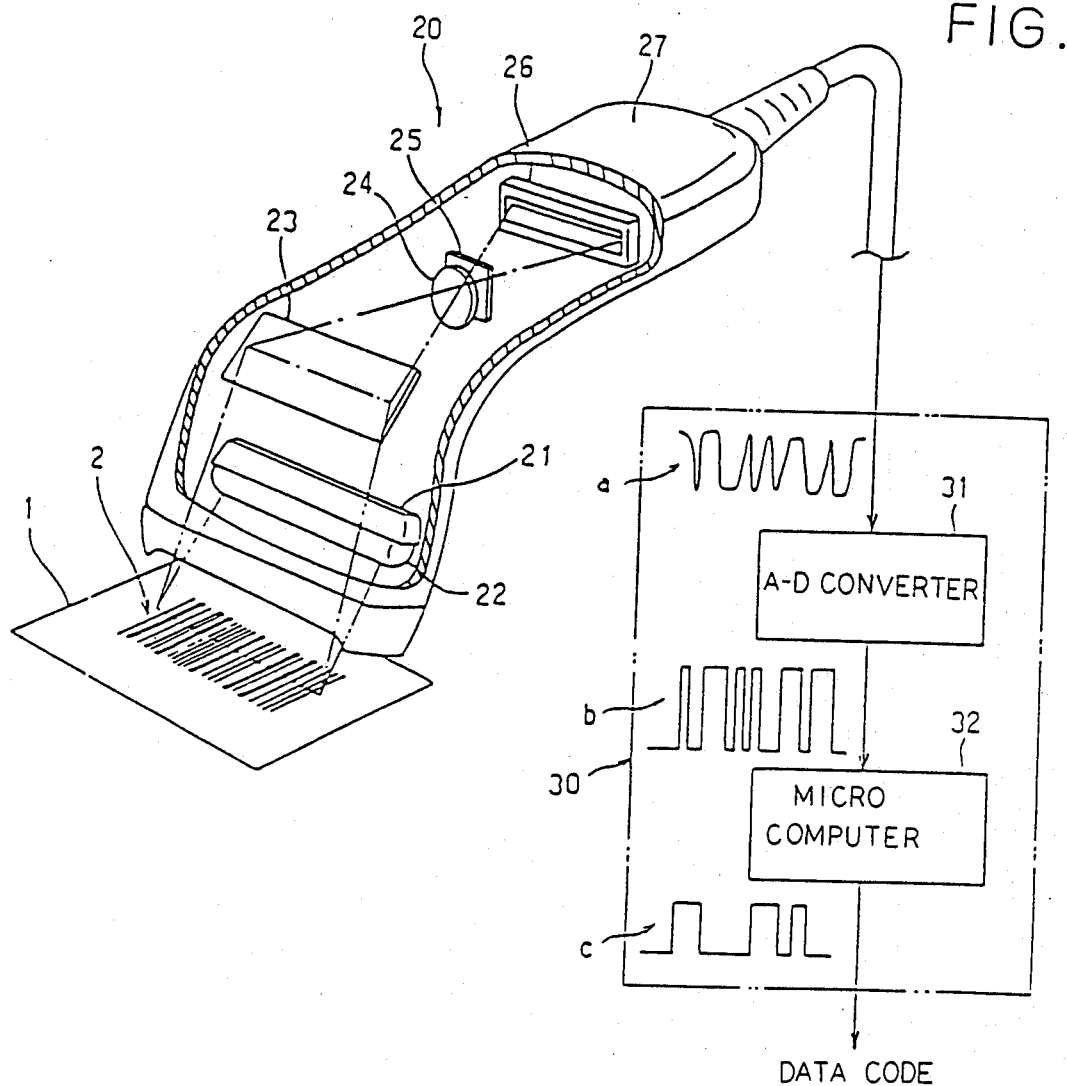
FIG. 8 is a schematic diagram of a bar code reader wherein a sensor section is illustrated in perspective view with portions broken away and a signal processing section in block form.

The process of reading the bar codes of the respective embodiments described above will now be described. FIG. 8 is a schematic diagram of the configuration of a bar code reader wherein a sensor section is illustrated in perspective view with portions broken away and a signal processing section in block form.

The image of the bar code 2 focused on an image sensor 26 of a sensor section 20 is converted by the image sensor 26 into an electric signal a reflecting light and shade. This electric signal a is applied to an A-D converter 31 where it is converted into a binary signal b acceptable to a microcomputer 32, thus is applied to the microcomputer 32. The microcomputer 32 stores the signal b in its memory in the form of width data corresponding to the respective bars of the bar code 2, after performing a certain process, decodes the data to obtain characters, and converts them into the form of a certain code (for example, ASCII code) to output a digital signal c.

Figure 9:
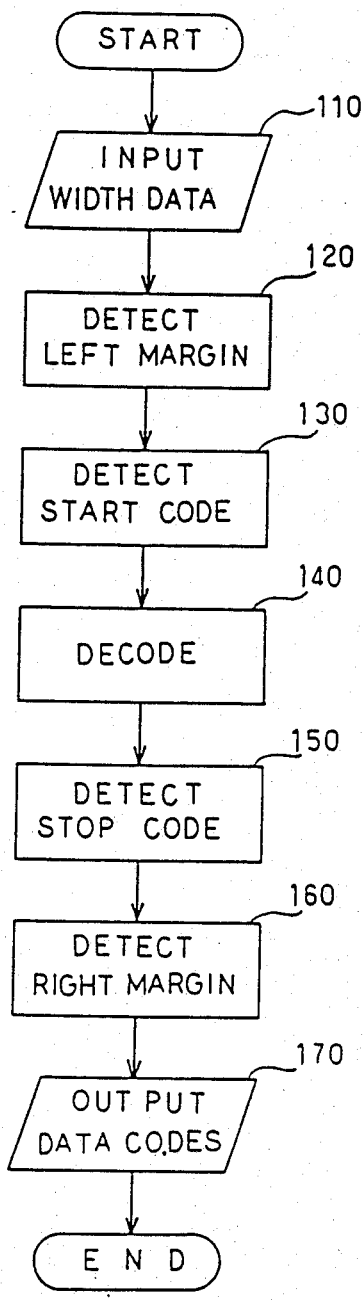

FIG. 9 is a flowchart showing a part of the process of the microcomputer 32. First, in step 110, the binary output obtained through one reading operation of the image sensor 26 is stored in the memory within the microcomputer 32 in the form of the width data of bars and spaces. In step 120, a left margin is detected which is a space whose length exceeds a predetermined value. In step 130, the start code is detected which starts from the bar subsequent to the space of the left margin.

When the left margin and the start code have been detected in step 120 and in step 130, this means that characters have been recorded subsequent to a space which is a next (first) character gap. If the start code has not been detected, this is judged as erroneous reading, and data are inputted again through the image sensor 126.

In step 140, the width data corresponding to the characters are decoded into data codes. This process will be described later in greater detail. In step 150, the stop code is detected to confirm the termination of the data codes. If the stop code has not been detected, this is judged as erroneous reading, and data are inputted again through the image sensor 26. In step 160, a right margin is detected which is a space whose length exceeds a predetermined value. In step 170, the characters corresponding to the data codes decoded in step 140 are converted into the form of the ASCII code and output.

Through a series of steps described above the reading operation of the bar code is completed, and the completion of reading is informed to an operator. As the process from step 110 to step 170 is completed, the image sensor 9 is instructed to perform reading again, so that the process from step 110 to step 170 is repeated.

Figure 10:
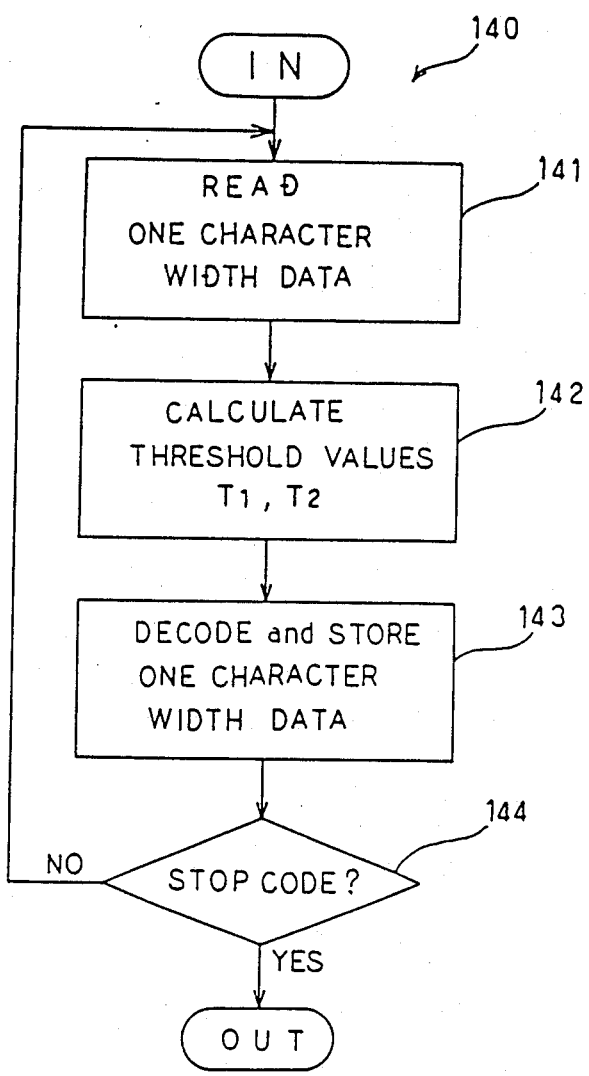
Figure 11:
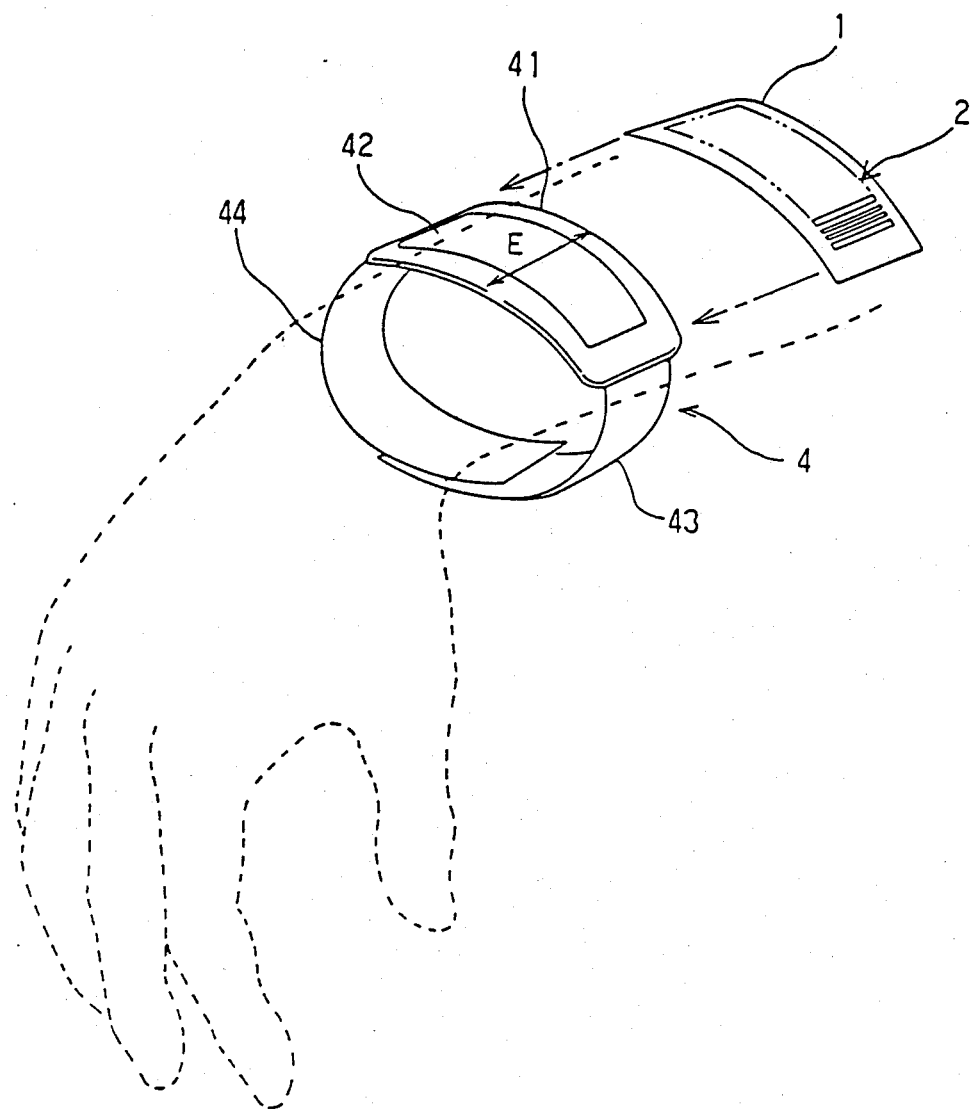
FIG. 11 is a perspective view of a belt being tied around a subject such as a portion of the human body which holds a label having a bar code printed thereon.

FIG. 10 is a flowchart showing in greater detail the step 140 shown in FIG. 9. In step 141, the width data corresponding to one character, for example a combination of seven bars and spaces in the case of the NW-7 system, are read out of the memory.

In step 142, threshold values for discrimination of the width of the bar and of the space are calculated. In the case of the NW-7 system, since the bars and spaces are of two types and grouped as wide and narrow, a bar-discrimination threshold value $T_1$ and a space-discrimination threshold value $T_2$ are calculated. For example, letting the width of the most narrow bar among the width data of one character be X, the threshold value T1 is determined to be of the order of $$(T_1) = \frac{1 + 2.5}{2} \times X$$

Of course, this threshold value may be obtained from the most wide bar.

In step 143, the bars and spaces are discriminated in terms of narrow and wide on the basis of the threshold values $T_1$ and $T_2$, and converted into the character codes. Then, in accordance with the bar system, the character codes are converted character by character into the form of the Data code (ASCII code). The Data code (ASCII code) is stored in the memory, which is outputted in step 170 in the form of the data codes.

If the character code decoded in step 143 is the stop code, the control branches in step 144 to YES and advances to step 150. If it is not the stop code, the process from step 141 to step 144 is repeated. Through the foregoing operation the bar code reader can read the bar code.

Having described the embodiments of the present invention, they can be modified as follows:

In the aforementioned embodiments, the magnifying factor of each bar is increased progressively character code by code. Differently, the magnifying factor of each bar may be increased progressively bar by bar as separating from the center line of the bar code toward either end over the whole bar code.

Further, only for the bars of the endmost character codes, the magnifying factor of each bar may be increased progressively as approaching either end.

If so modified as above, the gradient of the circumferential surface is well cancelled, thus, a possibility of erroneous reading is further reduced. In the aforementioned embodiments, the bar code printer system is adapted to widen the width of each bar of the endmost character codes in accordance with a predetermined magnifying factor.

The above may be modified in such a way that each bar is printed by inputting a character train to be converted into a bar code, the radius of a circumferential surface on which the bar code label 1 is provided, and the like, calculating a width being established with the width (the reference value) of each bar of a normal bar is projected from a flat surface onto a circumferential surface, and using the thus calculated width.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A bar code label displaying encoded information, comprising:
   (a) a recording medium; and
   (b) a bar code recorded on the recording medium, the bar code having a plurality of parallel bar elements, each of which has a width indicating a code of the encoded information, the bar code being divided into at least three groups, each group having a plurality of the bar elements, a third group provided between a first and a second groups, a width of a first bar element of the second group indicating the same code as that of a second bar element of the third group, the first bar element of the second group being wider than that of the second bar element of the third group.

2. A bar code label according to claim 1 wherein each of the first and second groups are provided in both sides of the bar code.

3. A bar code label according to claim 1, wherein the third group is provided in a center of the bar code.

4. A bar code label displaying encoded information comprising:
   (a) a recording medium; and
   (b) a bar code recorded on the recording medium, the bar code having a plurality of parallel bar elements, each of which has a width having some ratio relationship of bar element width to reference width, the width of each bar element indicating a code of the encoded information, the bar code being divided into at least three groups, each having a plurality of the bar elements and an associated reference width, a third group being provided between a first and a second group, a reference width of the second group being wider than a reference width of the third group.

5. A bar code label according to claim 4, wherein at least one bar element of a given group has a width equal to the reference width associated with that group.

6. A bar code label according to claim 4, further comprising a fourth group of bar elements provided between the second and third groups, a reference width of the fourth group being wider than a reference width of the third group and narrower than a reference width of the second group.

7. A bar code label according to claim 4, wherein each of the groups corresponds to an alpha-numeric character of the information encoded in the bar code.

8. A bar code label displaying encoded information, comprising:
   (a) a recording medium; and,
   (b) a bar code recorded on the recording medium, the bar code having a plurality of parallel bar elements, each of which has a width having some ratio relationship of bar element width to a reference width, the width of each bar element indicating a code of the encoded information, the bar code being divided into at least three groups, each having a plurality of the bar elements and a ratio associated with these widths, a third group being provided between a first and a second group, the ratio of the second group being greater than the ratio of the third group.

9. A bar code label according to claim 8, wherein at least one bar element of each group has a width equal to the reference width.

10. A bar code label according to claim 8, further comprising a fourth group of the bar elements provided between the second and third groups, the ratio of the fourth group being greater than the ratio of the third group and smaller than a ratio of the second group.

11. A bar code label according to claim 8, wherein each of the groups corresponds to a character of the information.

12. A method for printing bar code on a recording medium, comprising steps of:
    (a) inputting information to be encoded into a bar code;
    (b) encoding the information as a code train having at least three parts:
    (c) first printing a plurality of first bar elements, each of which has a width indicating a code of a third part of the code train, the third part being provided between a first and a second part of the code train; and
    (d) second printing a plurality of a second bar elements, each of which has a width indicating a code of the second parts of the code train and being wider than a width of the first bar element indicating a same code of the second bar element, so that the bar code being divided into at least three groups, a third group provided between a first and a second group, a width of the second bar element of the second group indicating the same code as that of the first bar element of the third group, the second bar element of the second group being wider than that of the first bar element of the third group.

13. A method for printing a bar code on a recording medium according to claim 12, wherein the first printing step is carried out before the second printing step.

14. A method for printing a bar code on a recording medium according to claim 12, wherein the second printing step is carried out before the first printing step.

15. A method for printing a bar code on a recording medium, comprising steps of:
    (a) inputting information to be encoded as a bar code;
    (b) encoding the information as a code train having at least three parts, a third part provided between a first and second parts;
    (c) first printing a plurality of parallel first bar elements, each of which has a width having some ratio relationship of bar element width to a reference width, the width of each of the first bar element indicating a code of the third part of the code train; and
    (d) second printing a plurality of parallel second bar elements, each of which has a width having some ratio relationship of bar element width to a reference width being wider than the reference width of the first bar elements, the width of each of the second bar element indicating a code of the second part of the code train,
    so that the width of the second bar element indicating the same code as that of the first bar element being wider than that of the first bar element.

16. A method according to claim 15, wherein the first printing step is carried out before the second printing step.

17. A method according to claim 15, wherein the second printing step is carried out before the first printing step.

* * * * *